(12) United States Patent
Arnal et al.

(10) Patent No.: US 9,813,221 B2
(45) Date of Patent: Nov. 7, 2017

(54) COMBINED FLOW AND LOW-POWER STATE CONTROL USING SAME LINES BETWEEN INTERFACES

(71) Applicant: STMICROELECTRONICS (ROUSSET) SAS, Rousset (FR)

(72) Inventors: Christophe Arnal, Saint Vallier de Thiey (FR); Roland Van Der Tuijn, Mouans-Sartoux (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 236 days.

(21) Appl. No.: 14/531,442

(22) Filed: Nov. 3, 2014

(65) Prior Publication Data
US 2015/0131497 A1    May 14, 2015

(30) Foreign Application Priority Data
Nov. 13, 2013    (FR) ...................................... 13 61090

(51) Int. Cl.
| | | |
|---|---|---|
| *H04B 1/44* | (2006.01) | |
| *H04L 5/14* | (2006.01) | |
| *H04L 12/801* | (2013.01) | |
| *H04W 4/04* | (2009.01) | |
| *G06F 13/42* | (2006.01) | |

(52) U.S. Cl.
CPC ........ *H04L 5/1415* (2013.01); *G06F 13/4291* (2013.01); *H04L 47/35* (2013.01); *H04W 4/04* (2013.01)

(58) Field of Classification Search
CPC ..................................................... H04W 24/04
See application file for complete search history.

(56) References Cited

U.S. PATENT DOCUMENTS

| | | | | |
|---|---|---|---|---|
| 6,467,042 B1 * | 10/2002 | Wright | ................. | G06F 1/3203 713/320 |
| 7,447,927 B2 * | 11/2008 | Siegmund | ............... | H04L 12/12 370/389 |
| 8,787,471 B1 * | 7/2014 | Lifshitz | ................... | H04B 1/40 375/260 |

(Continued)

FOREIGN PATENT DOCUMENTS

| | | |
|---|---|---|
| EP | 1650669 A2 | 4/2006 |
| EP | 2547014 A1 | 1/2013 |

*Primary Examiner* — Mark Rinehart
*Assistant Examiner* — Angel Brockman
(74) *Attorney, Agent, or Firm* — Slater Matsil, LLP

(57) ABSTRACT

A method for controlling a low-power state of a pair of serial interfaces using a pair of flow-control signal lines may include enabling a first of the flow-control lines by a first one of the interfaces for signaling a transmission request to the second interface. The method may also include, in response to the transmission request, waking up to a live state from a low-power state and enabling a second flow-control line for signaling a transmission authorization to the first interface. In response to the transmission authorization, the method may include initiating a transmission of a message to the second interface, and upon reaching an offset before the end of the message transmission, disabling the first flow-control line by the first interface. The method may also include, at the end of the message transmission, disabling the second flow-control line and going back into the low-power state.

20 Claims, 1 Drawing Sheet

(56) References Cited

U.S. PATENT DOCUMENTS

| | | | |
|---|---|---|---|
| 2007/0124621 A1* | 5/2007 | Kim | G06F 1/3203 |
| | | | 713/323 |
| 2007/0271480 A1* | 11/2007 | Oh | G10L 19/005 |
| | | | 714/3 |
| 2013/0073821 A1* | 3/2013 | Flynn | G06F 3/061 |
| | | | 711/162 |
| 2014/0105101 A1* | 4/2014 | Vu | H04L 1/0008 |
| | | | 370/328 |

* cited by examiner

COMBINED FLOW AND LOW-POWER STATE CONTROL USING SAME LINES BETWEEN INTERFACES

FIELD OF THE INVENTION

The invention relates to power saving in serial communication interfaces, more particularly, in serial interfaces using flow-control signals.

BACKGROUND OF THE INVENTION

FIG. 1 schematically shows a conventional full-duplex serial communication system. It includes a pair of similar serial interfaces SIF1 and SIF2, such as UARTs, connected to each other in a 5-wire configuration. These wires carry four signals and a common ground. The ground wire is not shown.

Each serial interface has a transmit output TX, a receive input RX, a flow-control output RTS, and a flow-control input CTS. The TX and RTS outputs of interface SIF1 are connected respectively to the RX and CTS inputs (RX2, CTS2) of interface SIF2. The RX and CTS inputs of interface SIF1 are connected respectively to the TX and RTS outputs (TX2, RTS2) of interface SIF2.

Historically "RTS" and "CTS" stand for "Request To Send" and "Clear To Send". This terminology is no longer relevant to the way these signals are used today in UARTs. In practice, an active state of the RTS signal indicates to the remote interface that it may send data, and an inactive state indicates that the remote interface should stop sending data, for instance because the receive buffer in the local interface is full.

FIG. 2 is a diagram showing an exemplary message transmission sequence from interface SIF1 to SIF2. The signals and lines are named according to the corresponding input/output terminals of interface SIF1.

The signals are active-low, i.e. a signal at "1" is inactive and a signal at "0" is active. Initially all signals are inactive (at "1"), for instance during power-on. At some point in time, for instance after a reset in each of the interfaces, the RTS and CTS signals become active. The signal CTS is shown as becoming active after signal RTS, but this order of events is not necessary. A transmission of a serial data message on line TX may only start when signal CTS is active, from a time t0. The state of signal RTS is irrelevant to the transmission.

A message transmission on line TX is shown as black areas. The transmission may start as soon as signal CTS is enabled, at time t0. At a time t1, the remote interface SIF2 disables signal CTS to indicate that it can no longer receive data. Interface SIF1 responds by suspending the message transmission. In practice, interface SIF1 finishes the transmission of the current atomic data unit, for instance a byte, before actually stopping the transmission, whereby the transmission may continue for a short period of time after t1, as shown.

When the remote interface SIF2 is ready to receive data again, it activates signal CTS at a time t2, from which the interrupted transmission may resume on line TX. When the transmission is finished, both interfaces are idle and the signals RTS and CTS remain active as long as the interfaces are powered, meaning that each interface is ready to receive data.

In some applications, it is desirable to set the interfaces SIF1 and SIF2 in a low-power state while they are not communicating, for instance by turning off their clocks. When the interfaces need to communicate again, they should be able to wake each other up. Such a goal has been achieved, for example, by providing additional signal lines between the interfaces, whose sole purpose is to allow each interface to wake-up the other interface from a low-power state. This approach is described, for instance, in "Transport Bus Driver for Bluetooth Power Control Handling Guidelines" published by Microsoft and available from the following link: http://feishare.com/attachments/article/291/transport-bus-driver-for-bluetooth-power-handling.pdf.

SUMMARY OF THE INVENTION

Serial interfaces that can mutually control their low-power states using standard signal lines and involving minimal modifications of a standard serial interface are thus desirable.

This desire is addressed by a method for controlling a low-power state of a pair of similar serial interfaces using a pair of flow-control signal lines. The method includes enabling a first of the flow-control lines by a first of the interfaces for signaling a transmission request to the second interface, and in response to the transmission request by the second interface, waking up to a live state from a low-power state; enabling the second flow-control line by the second interface for signaling a transmission authorization to the first interface. The method also includes, in response to the transmission authorization by the first interface, initiating a transmission of a message to the second interface, and upon reaching an offset before the end of the message transmission, disabling the first flow-control line by the first interface. The method further includes, at the end of the message transmission, disabling the second flow-control line by the second interface and going back into the low-power state.

According to an embodiment, the method may also include providing an end-of-transmission flag in the header of each message of a sequence of messages and setting the end-of-transmission flag in only the last message of the sequence. The method may further include disabling the second flow-control line at the end of the message that has the end-of-transmission flag set.

According to an embodiment, the method may further include transmitting a second message by the second interface to the first interface and, after disabling the second flow-control line by the second interface during transmission of the second message, suspending transmission of the second message, disabling the second flow-control line, and enabling the second flow-control line again for signaling a transmission request to the first interface. The method may also include enabling the first flow-control line for signaling a transmission authorization to the second interface, and, in response to the transmission authorization by the second interface, continuing transmission of the second message.

According to an embodiment, the method may further include conveying a message length in a header of the transmitted message, and identifying the end of the message transmission by comparing the received data count to the message length. According to an embodiment, the offset is equal to an atomic data unit whose transmission is not suspended by a flow-control signal.

A method may also be provided for controlling a low-power state of a receiver serial interface. The method may include waking-up from the low-power state when a flow-control input of the interface is enabled; receiving a message on a serial data input of the interface, and returning to the low-power state at the end of the message.

A method may also be provided for controlling a low-power state of a transmitter serial interface. The method may include transmitting a message on a serial data output, and disabling a flow-control output before the end of the message transmission. The method may further include going into the low-power state when a flow-control input is disabled.

A serial interface may be provided that may include a serial data input, a flow-control input, and circuitry configured for setting the interface in a low-power state at the end of a message received on the serial data input, and waking-up the interface to a live state from the low-power state when the flow-control input is enabled.

According to an embodiment, the circuitry is further configured for retrieving a message length conveyed in a header of the message received on the serial data input, and identifying the message end by comparing the received data count to the message length.

A serial interface may be provided that may include a serial data output, a flow-control output and a flow-control input, and circuitry configured for transmitting a message on the data output, disabling the flow-control output before the end of the message, and setting the interface in a low-power state when the flow-control input is disabled.

DETAILED DESCRIPTION OF THE PREFERRED EMBODIMENTS

A protocol is disclosed herein that allows transmitting bidirectional low-power state control commands between serial interfaces, over a pair of lines that are conventionally used for flow-control, such as the RTS/CTS lines used in UARTs.

Figure 1:
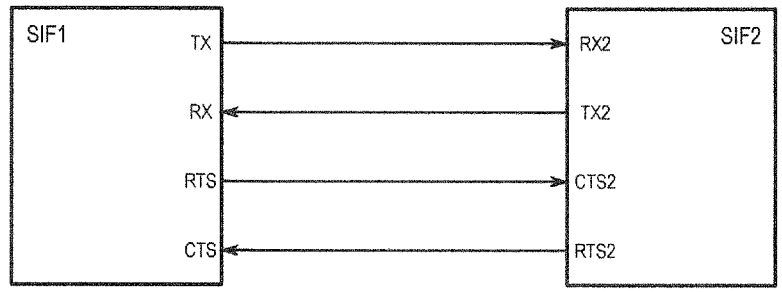
FIG. 1 schematically shows a conventional full-duplex serial communication system in accordance with the prior art.
Figure 2:
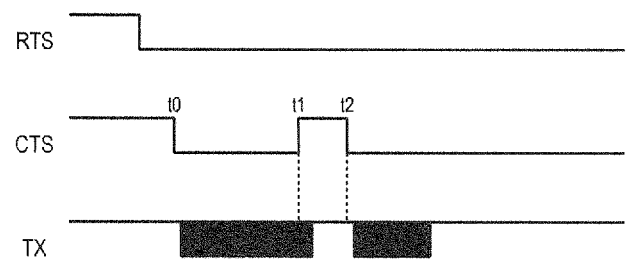
FIG. 2 is a diagram showing an exemplary message transmission sequence between the two serial interfaces of FIG. 1.
Figure 3:
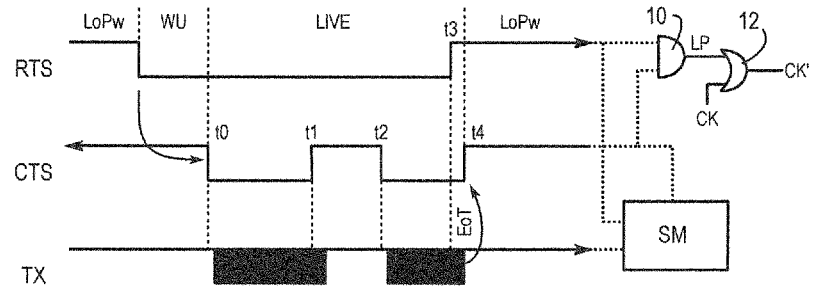
FIG. 3 is a diagram showing an exemplary message transmission sequence between two interfaces implementing a low-power state control protocol in accordance with an embodiment of the present invention.

FIG. 3 is a diagram showing an exemplary message transmission sequence between two interfaces SIF1 and SIF2 implementing such a protocol, in similar conditions as in FIG. 2. The signals and lines are named according to the corresponding input/output terminals of interface SIF1.

Initially, both interfaces are in a low-power state (LoPw), such as with their clock signals turned off. The interfaces are thus unable to process incoming data, whereby the RTS and CTS signals are both inactive (at "1"). Eventually, interface SIF1 needs to transmit data to interface SIF2 through line TX. Interface SIF1 is awoken locally, for instance by a local host processor, and activates signal RTS (pulling it to "0"). The activation of signal RTS represents a wake-up command (WU) for interface SIF2. Interface SIF2 responds by awakening and activating signal CTS at a time t0, indicating that it is ready to receive data.

From time t0, both interfaces are live. Interface SIF1 starts transmitting data through signal TX. At a time t1, like in FIG. 2, the remote interface SIF2 may disable signal CTS to indicate that it can no longer receive data. Interface SIF1 responds by suspending the message transmission after the current atomic data unit. When the remote interface SIF2 is ready to receive data again, it activates signal CTS at a time t2, from which the interrupted transmission may resume on line TX.

The waveforms of signals RTS, CTS and TX are similar to those of FIG. 2 up to time t2. However, the activation of signal RTS does not only mean that interface SIF1 may receive data; it has the additional role of waking-up the remote interface SIF2.

At a time t3, before the end of the message transmission, the interface SIF1 disables signal RTS even though it may be ready to receive data. This particular event prepares the interface SIF1 to switch into its low-power state at the end of the message, awaiting a confirmation by the remote interface.

When the full message is received by the remote interface SIF2 at a time t4, the interface SIF2 disables signal CTS and switches into its low-power state. Interface SIF1 takes the rising edge of signal CTS as the expected confirmation and switches in turn into its low-power state.

The remote interface SIF2 is thus configured to identify when the "full message" is received, i.e. identify an end-of-transmission EoT. A message usually includes a header that indicates the length of the message. Thus the remote interface may keep track of the current number of bytes received for the message, and it registers an end-of-transmission when the last byte of the message is received.

With this configuration, the interface SIF2 would switch into the low-power state after each message. In practice, however, a transmission may include a sequence of closely spaced or even contiguous messages, because the amount of data to be sent may not fit in one message. In this situation, going through a low-power state after each message would increase the time intervals between messages, and thus reduce the data transmission rate.

To avoid this situation, the message headers may be designed to include an end-of-transmission flag that is set only in the last message of a transmission sequence. The remote interface is then configured to read this flag in each message and disable signal CTS only at the end of the message having the flag set.

The event of signal RTS going high while the transmission on line TX is unfinished may occur in normal circumstances where interface SIF1 would request interface SIF2 to stop sending data. The above-described operation does not interfere with this. Therefore the offset between the time t3 when signal RTS is disabled and the time t4 when the full message is received is preferably as small as possible to shorten the time interval t4-t3. Indeed, during this interval, signal RTS is disabled and prevents interface SIF2 from sending data to interface SIF1.

Optimally, the offset thus corresponds to an atomic data unit, i.e. the smallest unit that will still be transmitted after a flow stop signal (signal CTS going high). The atomic data unit is often a "character" or byte. The figures show such a choice of the offset.

The right-hand side of FIG. 3 illustrates an exemplary circuit for controlling the low-power state of interface SIF2. A similar circuit would be provided in interface SIF1. An AND gate 10 receives the signals RTS and CTS. The output of gate 10 produces a low-power state switch signal LP that is at "1" only when both signals RTS and CTS are high, i.e.

inactive. Signal LP is fed to a first input of an OR gate 12. A second input of gate 12 receives a system clock signal CK. Gate 12 thus produces an internal clock signal CK' for the interface, that is turned off when signal LP is high. Signal CTS may be controlled by a state-machine SM that takes into account signals RTS and TX to conform signal CTS to the previously described protocol. The state-machine may be a modified version of one included in a standard interface.

Figure 4:
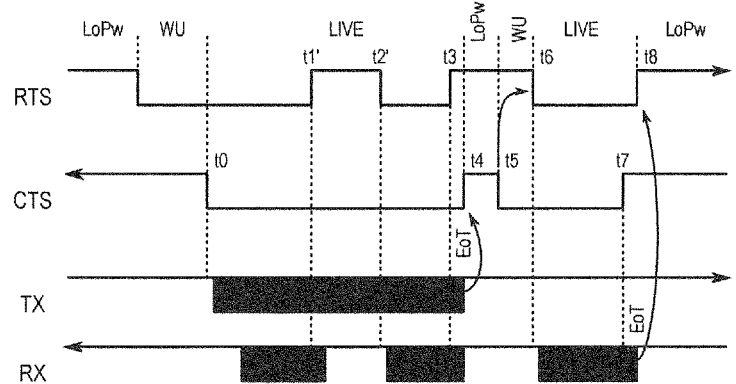
FIG. 4 is a diagram showing an exemplary bidirectional message transmission sequence between the two interfaces implementing a low-power state control protocol in accordance with an embodiment of the present invention.

FIG. 4 is a diagram showing an exemplary bidirectional message transmission sequence between two interfaces implementing the same protocol. This figure is intended in particular to demonstrate that the above protocol is compatible with a bidirectional transmission.

In addition to the signals of FIG. 3, FIG. 4 shows signal RX representing data received by interface SIF1 from interface SIF2. Up to time t0, the events are similar to those of FIG. 3.

From time to, interface SIF1 sends a message to interface SIF2 on line TX and also receives a message from interface SIF2 on line RX. At a time t1', interface SF1 disables the RTS signal to stop the incoming transmission on RX. This event happens while the outgoing transmission on TX is ongoing.

Signal RTS is enabled again at a time t2'. Interface SIF2 resumes the transmission on line RX. The ongoing message transmission on line TX does not reach its end between times t1' and t2', therefore the interface SIF2 does not detect an end-of-transmission, although signal RTS is high, and does not disable signal CTS to go into the low-power state.

Times t3 and t4 mark a low-power switching phase, as in FIG. 3. At time t3, interface SIF1 disables signal RTS while one byte remains to be transmitted for the message on line TX (it is assumed that one byte is the atomic data unit). This event is also interpreted by interface SIF2 as a flow stop signal, in a standard manner, whereby interface SIF2 reacts by suspending the transmission on line RX, after the current, atomic byte.

At time t4, as soon as the last byte of the message is received, interface SIF2 disables signal CTS and switches into low-power state. Interface SIF1, seeing both signals RTS and CTS high, in turn switches into low-power state. However, interface SIF2 still has data to send—the situation is similar to that of interface SIF1 in FIG. 3. Interface SIF2 is awoken locally and enables signal CTS at a time t5. Interface SIF1 interprets this as a wake-up event, goes live, and enables signal RTS at a time t6. At this point, interface SIF2 continues the transmission on line RX.

In this situation, the interface SIF2 "knows" it still has data to send, and the interface SIF1 "knows" it still has data to receive (because the received byte count has not reached the message length conveyed in the message header). It is then preferable that the interfaces do not actually go through their low-power state, because the wake-up delays (t4-t5 for interface SIF2, and t6-t5 for interface SIF1) may be non-negligible. Since each interface "knows" that it needs to stay awake, it may immediately enable signal RTS or CTS after it was disabled, reducing the delay to one system clock cycle.

At a time t7, one byte before the end of the transmission on line RX, interface SIF2 disables signal CTS Interface SIF1 awaits the last byte on line RX, then disables line RTS at time t8. With both lines RTS and CTS being high, both the interfaces switch into low-power state. Times t7 and t8, for interface SIF2, are analogous to times t3 and t4, for interface SIF1.

FIG. 4 reveals, between times t3 and t4, the optimal choice of the offset between the rising edge of signal RTS and the end of the message. This offset is one byte (or one atomic data unit), so that the transmissions on both lines TX and RX stop at the same time. If the offset were chosen smaller, time t4 would occur before the interface SIF2 has fully transmitted one byte. The last bits of the byte would be lost as interface SIF2 goes into low-power state. This data loss could be reduced or avoided by additional circuitry for delaying the low-power state switching. If the offset were chosen bigger, this would lengthen the interval t4-t3, reducing the global data rate of the link.

In exceptional circumstances, the ends of transmission EoT on lines RX and TX could be simultaneous, i.e. lines RTS and CTS would both be disabled at the same time. With the simplified circuit of FIG. 3, this would immediately put both interfaces in the low-power state, whereby the last byte of each transmission (TX, RX) would be lost. To avoid this, each interface may be configured to remain live until the last byte of the current incoming message has effectively been received.

What is claimed is:

1. A method for controlling a low-power state of a pair of serial interfaces using a pair of flow-control signal lines, the method comprising:
    enabling a first one of the pair of flow-control signal lines by a first one of the pair of serial interfaces for signal lines a transmission request to a second one of the pair of serial interfaces;
    in response to the transmission request, waking up the second one of the pair of serial interfaces to a live state from a low-power state;
    enabling a second one of the pair of flow-control signal lines by the second one of the pair of serial interfaces for signal lines a transmission authorization to the first one of the pair of serial interfaces;
    in response to the transmission authorization and while keeping enabled the first one of the pair of flow-control signal lines, initiating a transmission of a message by the first one of the pair of serial interfaces to the second one of the pair of serial interfaces;
    upon reaching an offset before an end of the transmission of the message, disabling the first one of the pair of flow-control signal lines by the first one of the pair of serial interfaces so that transmissions on the pair of serial interfaces end at a same time, the offset being defined by a smallest data unit whose transmission is not suspended by a flow-control signal;
    at the end of the transmission of the message, disabling the second one of the pair of flow-control signal lines by the second one of the pair of serial interfaces and transitioning the second one of the pair of serial interfaces into the low-power state.

2. The method of claim 1, further comprising:
    providing an end-of-transmission flag in a header of each message of a sequence of messages;
    setting the end-of-transmission flag in a last message of the sequence of messages; and
    disabling the second one of the pair of flow-control signal lines at an end of a message of the sequence of messages having the end-of-transmission flag set.

3. The method of claim 2, further comprising:
    disabling the first one of the pair of flow-control signal lines by the first one of the pair of serial interfaces; and
    in response to disabling the first one of the pair of flow-control signal lines, transitioning the second one of the pair of serial interfaces into the low-power state if the end-of-transmission flag in a message of the sequence of messages is set.

4. The method of claim 1, further comprising:
transmitting a second message from the second one of the pair of serial interfaces to the first one of the pair of serial interfaces;
after disabling the second one of the pair of flow-control signal lines by the second one of the pair of serial interfaces during transmission of the second message suspending transmission of the second message,
disabling the second one of the pair of flow-control signal lines, and
enabling the second one of the pair of flow-control signal lines again for signaling a transmission request to the first one of the pair of serial interfaces;
enabling the first one of the pair of flow-control signal lines for signaling a transmission authorization to the second one of the pair of serial interfaces; and
in response to the transmission authorization, continuing transmission of the second message.

5. The method of claim 1, further comprising:
conveying a message length in a header of the message; and
identifying the end of the transmission of the message by comparing a received data count to the message length.

6. The method of claim 1, wherein the first one of the pair of serial interfaces and the second one of the pair of serial interfaces transmit messages simultaneously.

7. The method of claim 1, further comprising:
disabling the first one of the pair of flow-control signal lines by the first one of the pair of serial interfaces; and
in response to disabling the first one of the pair of flow-control signal lines, transitioning the second one of the pair of serial interfaces into the low-power state.

8. A method for controlling a low-power state of a pair of serial interfaces using a pair of flow-control signal lines, the method comprising:
enabling a first one of the pair of flow-control signal lines by a first one of the pair of serial interfaces;
waking up a second one of the pair of serial interfaces to a live state from a low-power state based upon enabling the first one of the pair of flow-control signal lines;
enabling a second one of the pair of flow-control signal lines by the second one of the pair of serial interfaces;
while keeping enabled the first one of the pair of flow-control signal lines, initiating communication of a message to the second one of the pair of serial interfaces based upon enabling the second one of the pair of flow-control signal lines;
upon reaching an offset before an end of the message, disabling the first one of the pair of flow-control signal lines by the first one of the pair of serial interfaces so that communications on the pair of serial interfaces end at a same time, the offset being defined by a smallest data unit whose communication is not suspended by a flow-control signal; and
at the end of the communication of the message, disabling the second one of the pair of flow-control signal lines by the second one of the pair of serial interfaces and transitioning the second one of the pair of serial interfaces into the low-power state.

9. The method of claim 8, further comprising:
providing an end-of-transmission flag in a header of each message of a sequence of messages;
setting the end-of-transmission flag in a last message of the sequence of messages; and
disabling the second one of the pair of flow-control signal lines at an end of the last message of the sequence of messages.

10. The method of claim 8, further comprising:
communicating a second message from the second one of the pair of serial interfaces to the first one of the pair of serial interfaces;
after disabling the second one of the pair of flow-control signal lines by the second one of the pair of serial interfaces during communication of the second message
suspending communication of the second message,
disabling the second one of the pair of flow-control signal lines, and
enabling the second one of the pair of flow-control signal lines again for signaling a communication request to the first one of the pair of serial interfaces;
enabling the first one of the pair of flow-control signal lines for signaling a communication authorization to the second one of the pair of serial interfaces; and
in response to the communications authorization, continuing communication of the second message.

11. The method of claim 8, further comprising:
conveying a message length in a header of the message; and
identifying the end of the communication of the message by comparing a received data count to the message length.

12. The method of claim 8, wherein the first one of the pair of serial interfaces and the second one of the pair of serial interfaces transmit messages simultaneously.

13. A serial interface circuit comprising:
a pair of serial interfaces;
a pair of flow-control signal lines coupled between the pair of serial interfaces and configured to control the pair of serial interfaces; and
flow-control circuitry coupled to said pair of serial interfaces and said pair of flow-control signal lines, the flow-control circuitry configured to
enable a first one of the pair of flow-control signal lines by a first one of said pair of serial interfaces for signal lines a transmission request to a second one of the pair of serial interfaces,
in response to the transmission request, wake up the second one of the pair of serial interfaces to a live state from a low-power state,
enable a second one of the pair of flow-control signal lines by the second one of said pair of serial interfaces for signal lines a transmission authorization to the first one of said pair of serial interfaces,
in response to the transmission authorization and while keeping enabled the first one of the pair of flow-control signal lines, initiate a transmission of a message to the second one of said pair of serial interfaces,
upon reaching an offset before an end of the transmission of the message, disable the first one of the pair of flow-control signal lines by the first one of the pair of serial interfaces so that transmissions on said pair of serial interfaces end at a same time, the offset being defined by a smallest data unit whose transmission is not suspended by a flow-control signal, and
at the end of the transmission of the message, disable the second one of the pair of flow-control signal lines by the second one of the pair of serial interfaces and transitioning the second one of the pair of serial interfaces into the low-power state.

14. The serial interface circuit of claim 13, wherein said flow-control circuitry is configured to:
provide an end-of-transmission flag in a header of each message of a sequence of messages;

set the end-of-transmission flag in a last message of the sequence of messages; and disable the second one of the pair of flow-control signal lines at an end of the last message of the sequence of messages.

15. The serial interface circuit of claim 13, wherein said flow-control circuitry is configured to:

transmit a second message from the second one of the pair of serial interfaces to the first one of the pair of serial interfaces;

after disabling the second one of the pair of flow-control signal lines by the second one of the pair of serial interfaces during transmission of the second message suspend transmission of the second message, disable the second one of the pair of flow-control signal lines, and enable the second one of the pair of flow-control signal lines again for signaling a transmission request to the first one of the pair of serial interfaces;

enable the first one of the pair of flow-control signal lines for signaling a transmission authorization to the second one of the pair of serial interfaces; and in response to the transmission authorization, continue transmission of the second message.

16. The serial interface circuit of claim 13, wherein said flow-control circuitry is configured to:

convey a message length in a header of the message; and identify the end of the transmission of the message by comparing a received data count to the message length.

17. The serial interface circuit of claim 13, further comprising a clock gating circuit coupled to the second one of the pair of serial interfaces, the clock gating circuit having an output terminal and configured to produce a clock signal when the second one of the pair of serial interfaces is in the live state and configured to provide a DC signal when the second one of the pair of serial interfaces is in the low-power state.

18. The serial interface circuit of claim 17, wherein the clock gating circuit comprises:

an AND gate having a first input coupled to the first one of the pair of flow-control signal lines and a second input coupled to the second one of the pair of flow-control signal lines; and an OR gate having a first input coupled to an output of the AND gate, a second input coupled to a clock line and an output coupled to the output terminal of the clock gating circuit.

19. The serial interface circuit of claim 13, wherein the first one of the pair of serial interfaces and the second one of the pair of serial interfaces transmit messages simultaneously.

20. The serial interface circuit of claim 13, wherein the flow-control circuitry is further configured to:

disable the first one of the pair of flow-control signal lines by the first one of the pair of serial interfaces; and in response to disabling the first one of the pair of flow-control signal lines, transitioning the second one of the pair of serial interfaces into the low-power state.

* * * * *

UNITED STATES PATENT AND TRADEMARK OFFICE
CERTIFICATE OF CORRECTION

PATENT NO. : 9,813,221 B2
APPLICATION NO. : 14/531442
DATED : November 7, 2017
INVENTOR(S) : Christophe Arnal et al.

Page 1 of 1

It is certified that error appears in the above-identified patent and that said Letters Patent is hereby corrected as shown below:

In Column 6, Line 25-26, Claim 1, delete "serial interfaces for signal lines" and insert --serial interfaces for signalling--.

In Column 6, Line 32-33, Claim 1, delete "serial interfaces for signal lines" and insert --serial interfaces for signalling--.

In Column 8, Line 38-39, Claim 13, delete "serial interfaces for signal lines" and insert --serial interfaces for signalling--.

In Column 8, Line 45-46, Claim 13, delete "serial interfaces for signal lines" and insert --serial interfaces for signalling--.

Signed and Sealed this
First Day of May, 2018

Andrei Iancu
*Director of the United States Patent and Trademark Office*